United States Patent [19]

Robinson

[11] 4,187,511
[45] Feb. 5, 1980

[54] METHOD AND APPARATUS FOR FILLING THE MOVABLE RESERVOIR OF AN INKJET PRINTER

[75] Inventor: Prentice Robinson, Pelham, N.H.

[73] Assignee: Centronics Data Computer Corp., Hudson, N.H.

[21] Appl. No.: 890,620

[22] Filed: Mar. 20, 1978

[51] Int. Cl.² .......................................... G01D 15/18
[52] U.S. Cl. .................................. 346/75; 346/140 R
[58] Field of Search .............. 346/75, 140 R; 400/126

[56] References Cited

U.S. PATENT DOCUMENTS

| | | | |
|---|---|---|---|
| 2,976,103 | 3/1961 | Flanders | 346/29 |
| 3,929,071 | 12/1975 | Cialone | 346/75 X |
| 3,967,286 | 6/1976 | Andersson | 346/140 R |

Primary Examiner—Joseph W. Hartary
Attorney, Agent, or Firm—Lerner, David, Littenberg & Samuel

[57] ABSTRACT

An inkjet printer is provided with a movable carriage upon which is mounted an inkjet print head and a small reservoir having a fluid capacity capable of printing a predetermined number of characters, and which is sufficiently light in weight as to minimize the mass mounted upon the carriage. Sensing means detect the low level of ink for causing the carriage to be moved to the end of one of the printer margins at which is located a stationary large capacity ink reservoir having an outlet nozzle adapted to be inserted into an opening in the small capacity reservoir for filling the reservoir either under control of a pump or by gravity feed, whereupon the printer resumes the printing operation.

14 Claims, 9 Drawing Figures

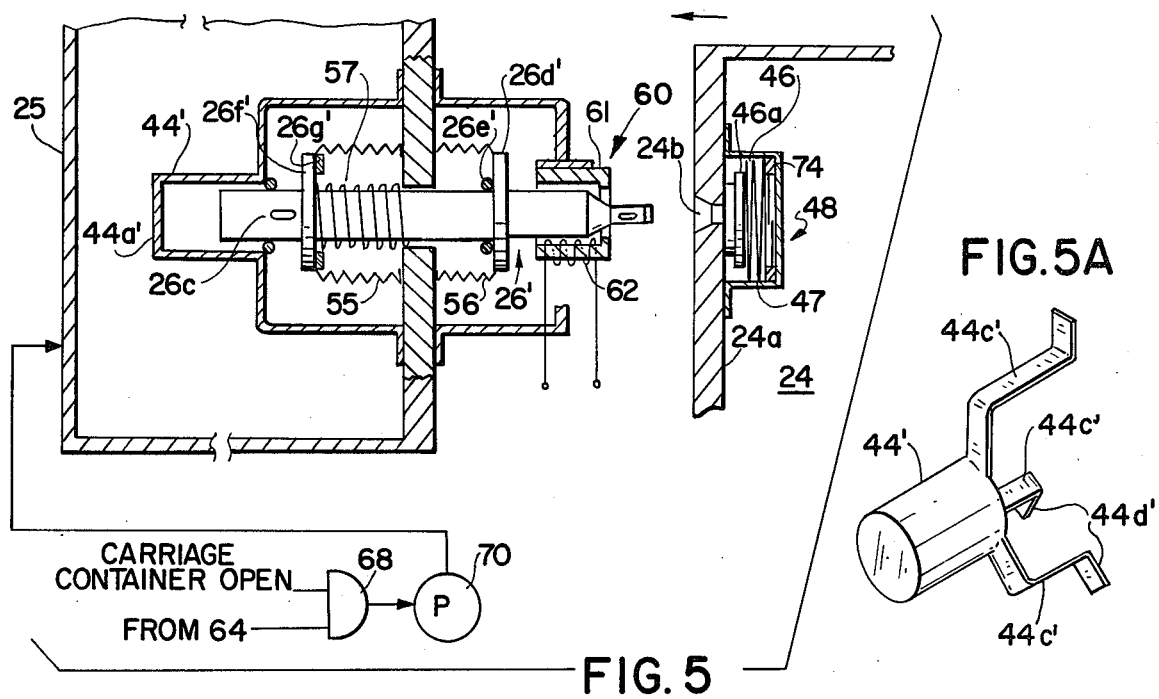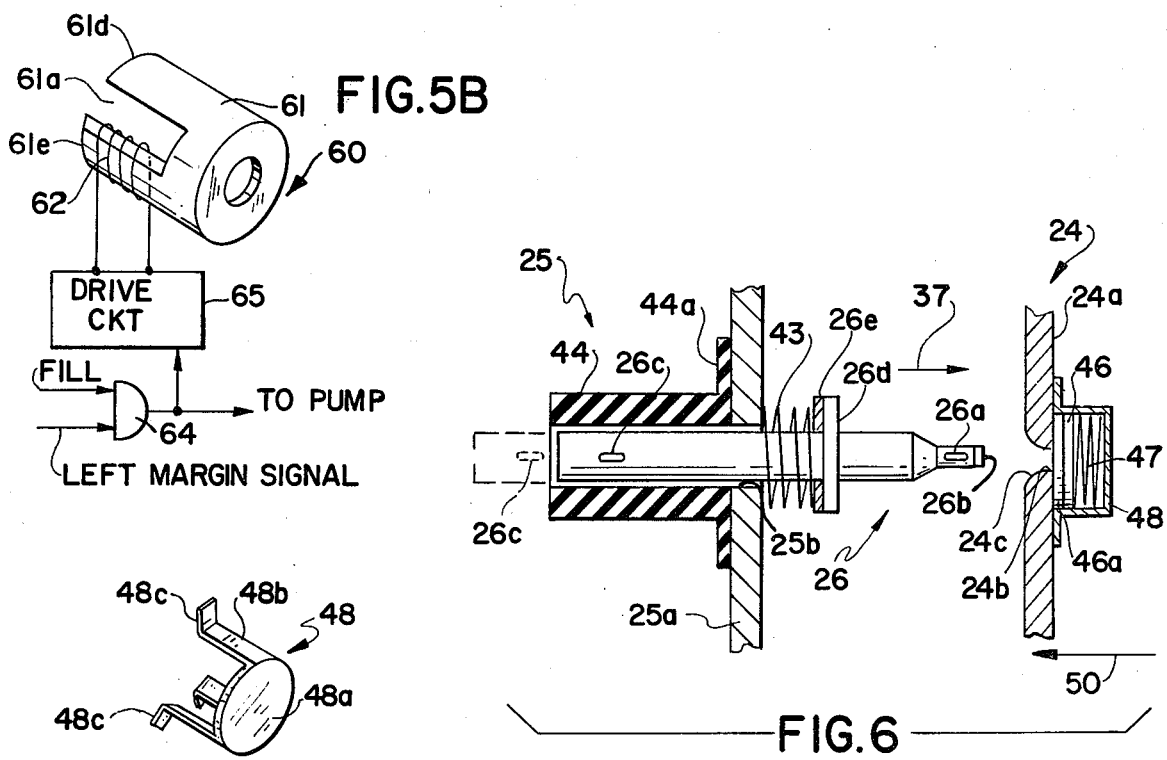

METHOD AND APPARATUS FOR FILLING THE MOVABLE RESERVOIR OF AN INKJET PRINTER

BACKGROUND OF THE INVENTION

An inkjet printer is a printer in which ink from a supply reservoir is transformed into small droplets which are propelled toward a paper document in seriatim. The droplets are exposed to an electrical field to cause them to assume a net charge whereupon deflection plates which are selectively energized by deflection voltage means cause the droplets to be deflected from a normal straight line path toward a paper document so as to form plural series of dots which collectively represent a character, symbol or other graphic patterns, in much the same way as characters are formed in impact printers of the dot matrix type, for example as taught by U.S. Pat. No. 3,703,949 issued Nov. 28, 1972 and assigned to the assignee of the present invention.

Inkjet printers typically utilize either of two basic methods for supplying ink from an ink supply to the inkjet head containing the nozzle or nozzles, depending upon the type of head employed. The first one of the above methods utilizes an ink supply reservoir which is mounted in a stationary position and is coupled to the inkjet head by means of a flexible tube for transporting ink to the head. The second method utilizes an ink supply reservoir which is mounted upon the same carriage as the inkjet head and which is transported with the head during printing, whereby the ink droplets are deflected vertically upward or downward while the head is moved across the paper document, in conventional printer designs.

Both of the above methods are cumbersome and costly and present a number of problems. The method in which a stationary reservoir is connected to the inkjet head through a tube requires an expensive pressure system to force the ink into the head and there is always the danger of breakage in the tube and spillage in the system. In the second method, the major problem is the transportation of the ink supply reservoir which reaches a practical limit as to the amount of ink which can be transported with the carriage, it being quite important to reduce the mass of the moving elements in order to achieve high printing speeds and to avoid the need for large driving means required to move such large masses.

BRIEF DESCRIPTION OF THE INVENTION

One highly advantageous solution to the above problems is characterized by the employment of a large ink supply reservoir mounted in a stationary fashion near one end of the path of horizontal movement of the inkjet print head and its carriage means. The inkjet print head is further associated with a very small ink supply reservoir utilized to supply ink for the ongoing printing. An ink low indicator is provided in the reservoir and, after printing a predetermined amount of lines or characters upon the generation of a low condition, the ink head is moved to the extreme left or right hand end of its path of movement, depending on the location of the large capacity ink supply whereupon it is then commanded by electronic software and/or hardware to be refilled with a suitable amount of ink from the main ink supply. The loading of the ink into the small portable reservoir located on the inkjet head is preferably activated by solenoid means with certain safety features built in, provided as part of the main ink supply system.

Among the main advantages of this system are the fact that the printer can be provided with an unlimited supply of ink without concern for the mass of the moving carriage and the head assembly mounted thereon, the fact that a very light weight head can be provided which enables the assembly to be transported by a low cost, horizontal escapement mechanism of significantly reduced output power requirements and size, and further that permanent fluid coupling between the stationary large capacity ink supply reservoir and the movable low capacity ink supply reservoir, and its attendant problems, are eliminated.

In one preferred embodiment, the sensing of the ink low condition causes the inkjet head to be moved to the appropriate margin of the printer after a predetermined number of lines have been printed. Microswitch or other proximity sensing means detect the presence of the carriage at the appropriate margin to activate a solenoid which causes a fill nozzle associated with the large ink supply reservoir to be urged outwardly therefrom so as to enter into the opening in the small capacity ink reservoir. Waterproof microswitch means detect the secure entry of the fill nozzle to activate a pump for urging ink from the large supply reservoir to the low capacity reservoir. Alternatively, filling may take place by a gravity feed arrangement.

In still another embodiment, a movable stop block is normally maintained in the position to prevent the carriage means to move beyond a predetermined location. After the ink low signal is generated and after the printer has printed a predetermined number of lines subsequent to the occurence of the ink low signal, the abutting block is shifted to a position which is out of the path of movement of the carriage means enabling the carriage means to move beyond the normal stop position and closer to the large capacity ink reservoir to urge the fill nozzle to enter into the releasably sealed opening of the movable low capacity ink supply reservoir and thereby refill the reservoir either under pressure or by a gravity feed technique. Sensing means detect the filled level to generate a signal enabling normal printing to resume.

BRIEF DESCRIPTION OF THE DRAWINGS AND OBJECTS OF THE INVENTION

It is therefore one object of the present invention to provide a novel method and apparatus for use with inkjet printers and the like in which a stationary ink supply reservoir is selectively coupled with a movable ink supply reservoir when monitor means yield an indication of an ink low condition to promptly refill the movable ink supply reservoir, enabling printing to be rapidly resumed.

The above as well as other objects of the invention will become apparent when reading the accompanying description and drawings in which:

FIG. 5 shows an elevational view of a portion of the refill apparatus in accordance with one embodiment of the present invention.

FIG. 5A shows a perspective view of the sealing sleeve useful in the embodiment shown in FIG. 5.

FIG. 5B shows a solenoid magnet core and control mechanism therefor, useful in the embodiment shown in FIG. 5.

FIG. 6 is an elevational view of a portion of the refill apparatus in accordance with another embodiment of the present invention.

FIG. 6b shows a perspective view of a mounting bracket for the closure member of the movable reservoir, useful in the embodiment shown in FIG. 6.

DETAILED DESCRIPTION OF THE INVENTION

Figures 1, 2, 3, 4:
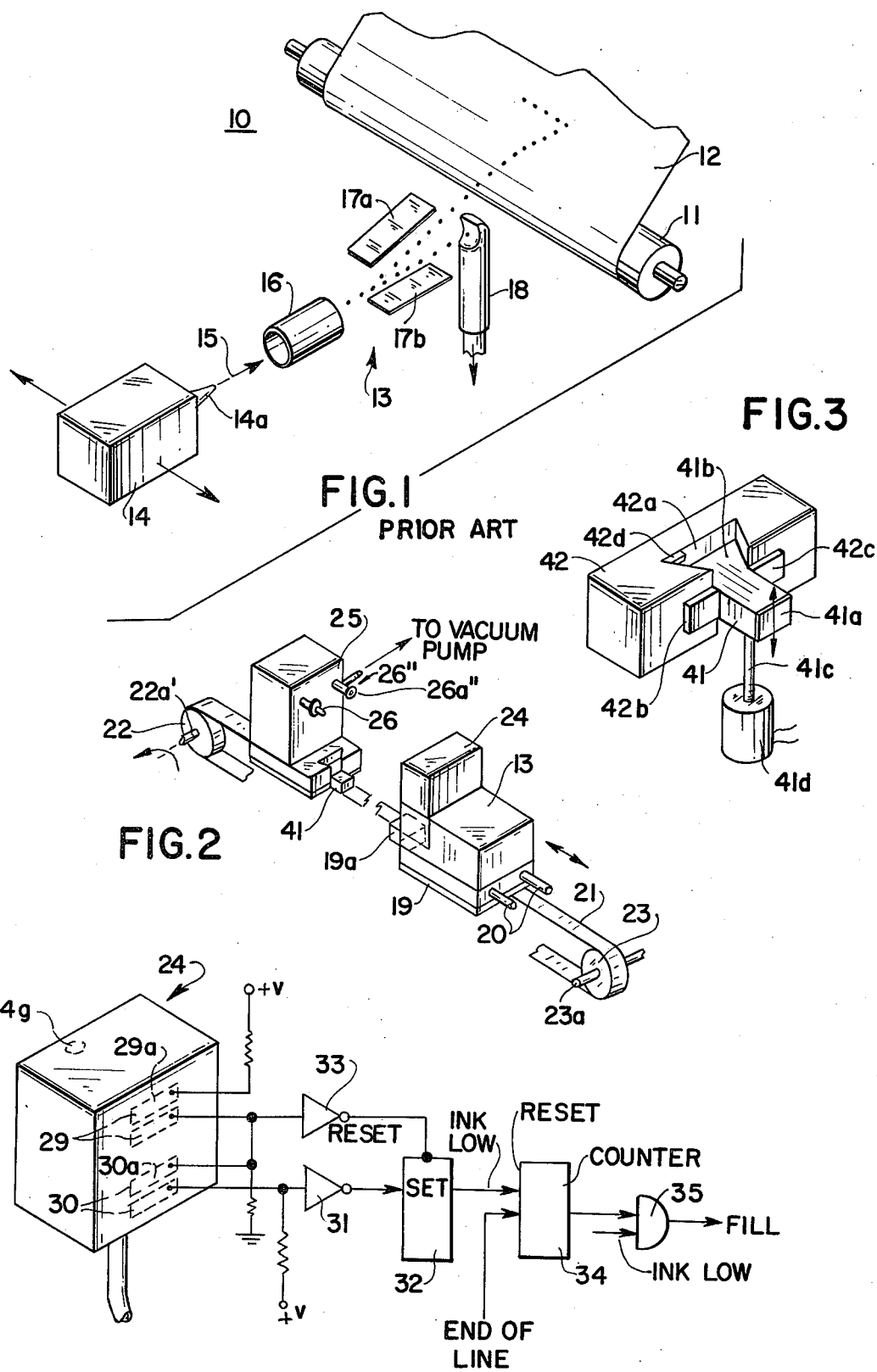
FIG. 1 is an exploded perspective view of the basic elements of an inkjet printer.
FIG. 2 shows a simplified perspective view of the carriage drive means for an inkjet printer of the type of FIG. 1, and showing the apparatus for providing ink in accordance with the present invention.
FIG. 3 shows a movable stop block mechanism for limiting carriage movement, in accordance with one embodiment of the present invention.
FIG. 4 shows schematically the level sensing means in accordance with one of the preferred embodiments of the present invention.

FIG. 1 shows the basic elements of an inkjet printer 10 as being comprised of a platen 11 for advancing a web 12 of indeterminent length. Positioned forward of the platen and paper web is an inkjet head assembly 13 shown in exploded fashion and comprising pump means 14 having a nozzle 14a and adapted to pump ink provided therein through a constricted conduit of predetermined configuration for forming droplets of a predetermined uniform size which are propelled in a direction shown by arrow 15 so as to pass through a charging electrode 16 which charges the droplets to a predetermined level. The droplets continue to move toward the paper web 12 and pass between a pair of deflection plates 17a and 71b which serve to deflect the droplets along a vertical path so that the drops strike the paper web and form columnar dot patterns with adjacent columns cooperating to collectively form predetermined characters or other symbols. As shown in FIG. 1 the inkjet head has been moved in a horizontal path and the droplets have been deflected in a vertical path so as to form the number "7".

Although the drops are produced in a continuous fashion, selected droplets propelled toward the paper web are not required for printing and in fact it is desired that such selected groups of dots be prevented from reaching the paper web. This is accomplished by providing a deflection voltage of appropriate polarity which causes the droplets not needed for printing to be propelled toward the gutter member 18 which collects such drops and returns them to the main ink supply reservoir in a manner to be more fully described here and below.

All of the above components forming the inkjet head assembly are arranged in much closer physical proximity and are mounted upon a carriage 19 shown in FIG. 2, which carriage is arranged to experience linear reciprocating movement in the horizontal direction, said linear movement being controlled by a pair of guide rods 20 extending through suitable openings provided in carriage 19. The carriage is secured to a closed looped timing belt 21 entrained about drive and driven pulleys 22 and 23 which are mounted upon drive shafts 22a and 23a respectively. Driven pulley 23 is mounted in a free-wheeling fashion while drive pulley 22 is driven into rotation in either clockwise or counterclockwise direction by suitable motor means to permit the carriage 19 and the inkjet head assembly 13 mounted thereon to move from left to right for unidirectional printing and to be returned from the right hand margin back to the left hand margin upon completion of a line of print, or alternatively to be moved from the left toward the right and back again for performing bi-directional printing. These techniques and the hardware utilized to accomplish such printing are well known in the art and are beyond the scope of the present invention, it being sufficient to understand that the carriage 19 experiences reciprocating movement at least between the left and right hand margins of paper web 12.

The carriage 19 is also adapted to receive and support a low capacity ink supply reservoir 24 which may either be incorporated as part of the pump 14 or be directly coupled thereto. The reservoir 24 may have a capacity for a supply of ink sufficient to print five pages of characters although a greater or lesser capacity may be provided, the criteria being to provide a carriage 19 and inkjet head assembly 13 having a mass which is sufficiently small to permit rapid acceleration and movement during printing and yet which is sufficiently large to minimize the number of ink refill operations required, said operations being described in detail here and below.

FIG. 2 further shows a large capacity ink reservoir 25 positioned on the left hand side of the printer so as to be adjacent to the left margin of the paper web 12 and arranged thereon in a stationary fashion. Although the large reservoir is shown as being mounted adjacent to the left margin of the paper web, it should be understood that the reservoir may alternatively be arranged adjacent to the right hand margin of the paper web. The reservoir is provided with an ink filling nozzle 26 preferably located either adjacent to or along the bottom of the reservoir and arranged to project toward the carriage 19 and the movable reservoir 24 mounted thereon. As will be described, nozzle 26 is adapted to enter into an opening provided along one wall of the reservoir 24 so as to push open a resiliently mounted sealing cap to permit filling to occur.

FIG. 4 shows level sensing means provided in reservoir 24 and some electronic hardware which may be utilized to control a refill operation responsive thereto.

The interior of the reservoir 24 is shown as being fitted with first and second pairs 29 and 30 of conductive contacts adhesively secured to one interior wall of the reservoir preferably across from the normally sealed opening to be described hereinbelow.

Each pair 29,30 of conductive contacts is spaced apart a predetermined amount in the vertical direction.

When the top surface of the ink falls below the lower edge of the upper contact 30a, an electrical circuit is broken causing voltage to be applied to inverter 31 which inverts the signal applied to the SET input of a bi-stable flip-flop 32 which operates in a manner to be more fully described. This will initiate a refill operation, however when the ink surface engages contact 30a, the signal will simply be removed from the flip-flop 32 but the flip-flop will not change state. When the reservoir 24 has been sufficiently refilled, the top surface of the ink will rise to a level sufficient to engage upper contact 29a thereby completing an electrical circuit, coupling high voltage to inverter 33 which inverts this signal and applies a low level signal to the reset input of the bi-stable flip-flop 32 to terminate the refilling operation. The contact pair 29 is set at a level which is below the desired maximum capacity since a small delay will occur between the sensing of a "filled" condition and the separation of the large capacity ink supply reservoir 25 therefrom as will be more fully described here and below.

The filling operation is initiated by the setting of bi-stable flip-flop 32 which applies a reset input to counter 34. Each time the printer completes a line of print, the proximity switch, reed switch or other suitable sensing element switch is activated when the carriage reaches the right hand margin to generate a signal utilized for initiating other printer functions as is well known in the art. In the present instance, this signal (identified herein as an END OF LINE signal) is applied to the LOAD input of the counter 34 which continues to accumulate counts as each line is completed. When a refill signal is developed, the counter is reset to zero and the counter is then permitted to begin a new count. In one particular embodiment, the printing of five additional lines may occur after generation of ink low signal although any other lesser or greater number of lines may be provided for simply by appropriately wiring counter 34. The output representative of a count of five is applied from counter 34 to input of gate 35, whose other input receives the ink low signal to develop a FILL signal to initiate the filling operation.

In the embodiment of FIG. 3 for example, the carriage 19 is adapted to move to the left and in doing so, its left hand edge, which is fitted with a resilient pad 19a, (see FIG. 2) is adapted to normally engage a similar pad 41a secured to slidably mounted carriage stop element 41 thereby normally limiting the extent of movement which the carriage may experience toward the left.

The carriage stop element 41 is provided with a flared end 41b opposite the end carrying resilient pad 41a, which flared end 41b fits within a groove 42a provided within a rigid element 42 which may either form part of the printer frame or be secured thereto, said groove 42a conforming substantially identically to the flared end shape of stop element 41.

The stop element 41 is adapted to be reciprocally movable in the vertical direction and its lower edge is secured to a connecting line 41c of a solenoid 41d. Bias means (not shown) normally causes linking member 41c to assume an upper most position maintaining stop element 41 in the solid line position shown in FIG. 2. Stop element 42d projecting into groove 42a, limits the upward travel of element 41. When energized, solenoid 41d urges connecting member 41c and hence carriage stop element 41 in the downward vertical direction so as to be positioned beneath carriage 19 and hence out of its path of movement. Thus when carriage 19 is moved toward the left, it is no longer restrained from stopping at its normal position but may move further to the left whereupon its cushioning element 19a is caused to engage cushioning pads 42b and 42c provided on opposite sides of groove 42a. This movement is sufficient to move the small supply reservoir 24 into close proximity with the large supply reservoir 25 so as to enable the nozzle 26 to enter into a sealed opening in reservoir 24.

Considering FIG. 6, the right hand wall 25a of large ink supply reservoir 25 is provided with an opening 25b for reciprocally mounting refill nozzle 26 which is an elongated member having a hollow interior and is provided with an outwardly projecting end with an opening 26a along its curved side wall and a cushioning pad 26b provided on its nose or tip. The opening 26a communicates with the nozzle hollow interior which in turn communicates with an opening 26c at the opposite end of the filler nozzle 26. A flange 26d is provided intermediate the ends of the nozzle 26 and a cushioning pad 26e is secured to the left hand face of flange 26d. The filler nozzle 26 extends through the center of helical spring 43 which is positioned between wall 25a and flange 26d to normally urge the nozzle 26 in the direction shown by arrow 37. A resilient stretchable sealing sleeve 44, which may for example be made of rubber or suitable rubber-like material has its foot portion 44a secured to the interior side of wall 25a and is adapted to completely surround and embrace the left hand end of FILL nozzle 26 so as to normally seal opening 26c thereby preventing ink in large reservoir 25 from leaving the reservoir during periods when no filling operation is being performed.

When the stop element 41 is moved beneath carriage 19, the carriage 19 and hence small reservoir 24 move sufficiently close to reservoir 25 to enable the right hand end of nozzle 26 to enter into the opening 24b provided in side wall 24a. The opening 24b is tapered as shown at 24c to facilitate guiding of the nozzle 26 into opening 24b. The cushioning pad 26b bears against the center of a disc 46 which serves to seal opening 24b by means of helical spring 47 which is positioned between the right hand side of disc 46 and the left hand side of the disc shaped portion 48a of mounting bracket 48 which is shown in detail in FIG. 6B as having a plurality of legs 48b each provided with a foot 48c for securement against the inner surface of wall 24e. Helical spring 47 normally urges disc 46 toward opening 24b. A ring or annular shaped gasket 46a is secured to the left hand surface of disc 46 to provide an excellent liquid tight seal under normal conditions.

The operation is such that the carriage 19 and hence movable reservoir 24 moves in a direction shown by arrow 50 causing the right hand tip of nozzle 26 to enter into opening 24b. The cushioning tip 26b engages the central portion of disc 46. The spring constant of spring 47 is preferably chosen to be greater than the spring constant of spring 43 so that, after entering into the opening, the seal is not broken but the nozzle instead moves toward the left as shown by arrow 50 against the biasing force of spring 43 until the pad 26e moves close to the outer surface of side wall 25a, at which time opening 26c moves to the left so as to be free of the sealing sleeve 44.

Subsequent thereto, and since the nozzle 26 can move no further to the left, the right hand tip urges disc 46 toward the right against the force biasing spring 47 so as to unseal opening 24b. Since opening 26a is arranged along one side wall of the nozzle, ink is now free to flow from supply reservoir 25 through opening 26c, the hollow interior of the FILL nozzle 26 and out of opening 26a so as to enter into the reservoir 24.

In a gravity feed type of apparatus, nozzle 26 is preferably arranged as close to the floor of the reservoir 25 as is practically possible while the opening 24b is preferably located near the top end of reservoir 24 permitting refilling in a gravity feed fashion. As an alternative, pump means may be coupled through the apparatus such as, for example, to the reservoir 25 for force feeding the liquid ink from reservoir 25 to reservoir 24.

As a further alternative a second nozzle 26" may be mounted upon the side wall of reservoir 25 and have its inner end connected to a vacuum pump (not shown) and its outer end provided with an opening surrounded with a resilient rubber-like cup adapted to form an air tight seal around an air vent opening 24g in container 24 (see FIGS. 2 and 4). When microswitch (for example microswitch 74 in FIG. 5) is activated indicating entry of the tip of nozzle 26 into opening 24b and movement of cup 26a" into sealing engagement with opening 24g, the vacuum pump connected with nozzle 26" is activated to cause rapid filling of the small capacity reservoir, the vacuum condition being conveyed to the interior of the movable reservoir 24 by the conduit or nozzle 26". It should be understood that the nozzle 26" may be reciprocally mounted upon the side wall of reservoir 25 by a bracket like that shown in FIG. 5A and be urged against the side wall of reservoir 24 by a solenoid of the type shown in FIG. 5B, also mounted to the mounting bracket.

When the reservoir 24 has been refilled, the ink full contacts 29 will reset bi-stable flip-flop 32 (see FIG. 4) removing the ink low signal so as to disable the FILL signal, serving to permit stop element 41 to be reset after carriage 19 is moved to the right. When the carriage 19 is moved to the right, nozzle 26 moves to the right with the carriage 19 until opening 26c is sealed by sleeve 44. The nozzle 26 may be provided with an additional flange along the interior thereof or alternatively, helical spring 43 may be secured to wall 25a and flange 26d to limit movement of the nozzle to the right. Due to the stronger spring constant of spring 47, the sealing cap 46 will also begin to move toward the sealing position to close the opening 24b.

As an alternative embodiment, the carriage stop element may be eliminated and replaced by a solenoid operated FILL nozzle 26' shown in FIG. 5.

The arrangement of the small ink supply reservoir 24 is basically identical to that shown in FIG. 6 wherein like elements are designated by like numerals.

The arrangement of FIG. 5 differs in that a sealing sleeve 44' having a closed end 44a' receives the left hand end of nozzle 26' through its open right hand end which is arranged a spaced distance from the right hand side wall 25a by spacer legs 44c' each having foot portions 44d' for securement to the interior side of wall 25a (see FIG. 5A). The nozzle 26' is provided with first and second flanges 26d' and 26f'. Flange 26d' is fitted with a gasket 26e' in the same manner as is shown in FIG. 6 while the right hand surface of flange of 26f' is fitted with a similar washer 26g'.

First and second flexible sealing bellows 55 and 56 are provided which may for example be generally hollow annular shaped accordian-pleated bellows wherein bellows 56 has its left hand end secured to the exterior surface of side wall 25a and its right hand end secured to flange 26d' while bellows 55 has its left hand end secured to flange 26f' and its right hand end secured to the interior surface of wall 25a. A helical spring 57 is arranged between gasket 26g' and the interior surface of wall 25a to normally bias the nozzle 26' toward the left so that opening 26c' is normally covered by sealing sleeve 44'.

A solenoid operating assembly 60 (see FIG. 5B) is secured to the exterior of side wall 25a so as to mount the solenoid magnetic core 61 thereto. The bracket may be similar to that shown in FIG. 5A wherein member 44' may be considered to be core 61 and wherein legs 44c' hold the core member spaced away from the exterior of side wall 25a, said legs being mounted to the surface of wall 25a by feet 44d.

FIG. 5B shows the detail of the solenoid magnetic core member 61 which is preferably a hollow annular shaped member having large slits arranged diametrically opposite one another, one of such slits being shown as 61a in FIG. 5B. An energizing winding 61 is wrapped around one of the legs formed by the pair of slits so as to provide a solenoid pulling action, as will be described.

Flange 26d' is preferably formed of a magnetic, ferromagnetic or other magnetizable material so as to be magnetically attracted toward the end faces 61d and 61e of the magnetic core 61. By energizing coil 62, the magnetic field causes flange 26d' to be urged toward the pole faces 61d and 61e whereby the nozzle 26' is moved toward the right and opening 26c is moved out of sealing engagement with sleeve 44'.

As was described hereinabove, the carriage 19 is obviously moved to the margin at which the large capacity reservoir 25 is located whereupon a suitable proximity switch is activated to develop a left margin signal which is combined with the FILL signal enabling gate 64 to activate drive circuit 65 for providing sufficient driving current for solenoid winding 62.

The flange 26d', as an alternative to being formed of a suitable ferromagnetic material, may have a suitable magnetically attractive material secured to its right hand face to co-act with the solenoid assembly (and functioning as an armature) providing the driving movement for the nozzle assembly. In this arrangement, the nozzle 26' enters into opening 24b in a manner similar to that described above in connection with FIG. 6.

A waterproof microswitch 74 (see FIG. 5) may be arranged to be engaged by disc 46 to control the filling operation when a pump (vacuum or compressor type) is utilized by providing a small capacity reservoir open signal which is combined with the output signal from gate 64 at gate 68 to activate pump 70. Alternatively, the gravity feed filling technique may be utilized.

It can be seen from the foregoing description that the present invention provides a novel arrangement for significantly reducing the weight of an inkjet print head assembly by utilizing a small reservoir mounted with the print head upon a carriage, which small reservoir is selectively coupled to a stationary mounted large capacity ink supply reservoir whereby moving the carriage to the "extended" position will automatically cause a filler nozzle to span between the reservoirs for filling purposes or alternatively by driving the filler nozzle by suitable solenoid or other means to span between the reservoirs and create a liquid coupling therebetween to initiate a filling operation, said liquid coupling being completely disrupted upon completion of the filling operation so that no connection whatsoever exists between the two reservoirs during ongoing printing.

Although the invention has been shown and described with reference to preferred embodiments, it should be understood by those skilled in the art that various changes may be made without departing from the spirit and scope of the invention and hence this invention is intended to be limited not by the embodiments described herein but only by the appending claims.

What is claimed is:

1. Means for providing ink for an inkjet printer, said printer including an inkjet print head and carriage means for supporting the print head;

means for moving said carriage means between left and right hand margins of the printer so as to effect printing of lines of characters of other graphic patterns on said web;

a small size ink reservoir mounted upon said carriage means;

a large size ink supply reservoir mounted in a stationary fashion upon said printer and adjacent to one of the aforesaid margins;

means for sensing an ink low condition in said small reservoir for generating an ink low signal;

means responsive to said ink low signal for moving said carriage means toward said stationary ink supply reservoir;

nozzle means including means normally biasing said nozzle means to a closed condition whereby said nozzle means is moved responsive to movement of the carriage adjacent to said stationary ink supply reservoir to become unsealed and to span between openings in said large and small ink supply reservoirs for causing ink to flow from said large reservoir to said small reservoir thereby enabling printing to continue.

2. The apparatus of claim 1 further comprising solenoid means energized responsive to said ink low signal for urging the nozzle means toward said movable reservoir so as to enter in an opening in one surface thereof.

3. The apparatus of claim 1 wherein said nozzle means comprises a hollow elongated substantially rigid tubular shaped member having openings along the side surfaces near its opposite ends;

a sleeve mounted inside said large size supply reservoir for sealing one of said openings;

an opening provided in said side wall for reciprocally mounting said nozzle;

said movable reservoir having an opening in one of said side walls arranged in axial alignment with said nozzle means so as to permit the end of said nozzle means projecting outwardly from said large capacity ink supply reservoir to enter into said opening.

4. The apparatus of claim 3 wherein the opening in said movable reservoir is provided with a closure cap and biasing means for normally biasing said closure cap into sealing arrangement with said opening whereby said nozzle means is adapted to urge the closure cap away from said opening when entering said opening.

5. The apparatus of claim 4 comprising solenoid means for moving said nozzle means, said nozzle means having a flange-like projection thereon formed of a material which is magnetically attractive so as to be attracted by said solenoid means when energized for urging the end of said nozzle projecting from said large capacity ink reservoir toward the opening in said small capacity ink reservoir.

6. The apparatus of claim 5 further comprising waterproof switch means mounted in said movable ink reservoir for activating a signal when the opening in the small size ink reservoir is unsealed;

means responsive to said signal for urging ink from said large size reservoir through said nozzle means and into said small size reservoir.

7. The apparatus of claim 1 further comprising slidably mounted stop element means having a first position for abutting against the carriage to limit further movement of the carriage means and having means for urging said stop element in a first direction to move the stop element out of the path of movement of said carriage means so as to enable the carriage means to move beyond the stop position previously established by said stop element means so as to enable the carriage to move closer to said large capacity ink supply reservoir enabling the nozzle means to move into a liquid coupling relationship with said small capacity ink reservoir.

8. The apparatus of claim 7 comprising bias means for normally biasing the nozzle means outwardly from said large capacity ink supply reservoir;

sealing means in said large capacity ink supply reservoir for sealing the opening in the end of said nozzle projecting into said large capacity reservoir;

said small capacity ink supply reservoir including closure cap means which is adaped to move away from sealing relationship with the opening in said small capacity ink reservoir for permitting the opening at the end of said nozzle projecting outwardly from said large capacity ink supply reservoir to enter into said opening and to move said nozzle means sufficiently to unseal the opening in the interior of said large reservoir from said sealing means to permit a refilling operation.

9. The apparatus of claim 1 further comprising means for initiating a filling operation by counting the number of lines printed by said inkjet print head after the occurence of said ink low signal and means responsive to a predetermined count to initiate the filling operation.

10. A method for supplying ink to an inkjet print head mounted upon a movable carriage together with a small capacity ink reservoir, said printer having a large capacity ink reservoir mounted adjacent one margin of the paper web upon which printing occurs, said filling method being comprised of the steps of:

generating an ink low signal when the ink in said low capacity reservoir falls below a predetermined level;

allowing printing to continue for a predetermined number of lines of print after occurence of an ink low signal and immeddiately thereafter moving said carriage toward said large capacity reservoir;

moving a reciprocally mounted nozzle element maintained in a normally liquid sealing position with said large capacity ink supply reservoir toward said small capacity ink supply reservoir after the latter has terminated its movement toward said large capacity ink supply reservoir;

urging said nozzle into a normally sealed opening in said small capacity ink reservoir whereby a liquid flow path is established between said reservoirs through said nozzle element.

11. The method of claim 10 further comprising the step of counting the number of lines printed after the occurence of an ink low signal and initiating the filling operation only after a predetermined count is reached.

12. The method of claim 10 further comprising the steps of limiting the movement of the carriage toward the stationary ink supply reservoir under normal printing operations and enabling the carriage means to be moved beyond the aforesaid limiting position and closer to the large supply ink reservoir responsive to an ink low signal.

13. The apparatus of claim 6 wherein said pump means is a vacuum pump;

said movable reservoir having a vent opening;

conduit means mounted upon said stationary reservoir and having a first end coupled to said pump and a resilient cup mounted upon its opposite end to surround said vent opening and be somewhat compressed when the reservoirs are in close proximity to create an air tight seal whereby the vacuum condition causes ink from the main supply reservoir to be drawn into said movable reservoir.

14. The apparatus of claim 13 wherein solenoid means is provided to move said conduit means against said vent opening.

* * * * *

UNITED STATES PATENT AND TRADEMARK OFFICE
CERTIFICATE OF CORRECTION

PATENT NO. : 4,187,511
DATED : February 5, 1980
INVENTOR(S) : PRENTICE ROBINSON

It is certified that error appears in the above-identified patent and that said Letters Patent are hereby corrected as shown below:

Column 3, line 34, change "71b" to --17b--.

Column 6, line 29, change "24e" to --24a--.

line 49, after "force" insert --of--.

Column 7, line 1, after "when" insert --a--.

line 65, change "44d" to --44d'.--

Column 8, line 2, change "61" to --62--.

Column 10, line 8, delete "adaped" and insert --adapted--.

line 32, delete "immeddiately" and insert --immediately--.

Signed and Sealed this

Twenty-eighth Day of October 1980

[SEAL]

Attest:

SIDNEY A. DIAMOND

Attesting Officer

Commissioner of Patents and Trademark